Feb. 1, 1944.  E. FISCHEL ET AL  2,340,524
AUTOMATIC CONTROL FOR AIRCRAFT AND THE LIKE
Original Filed June 2, 1934
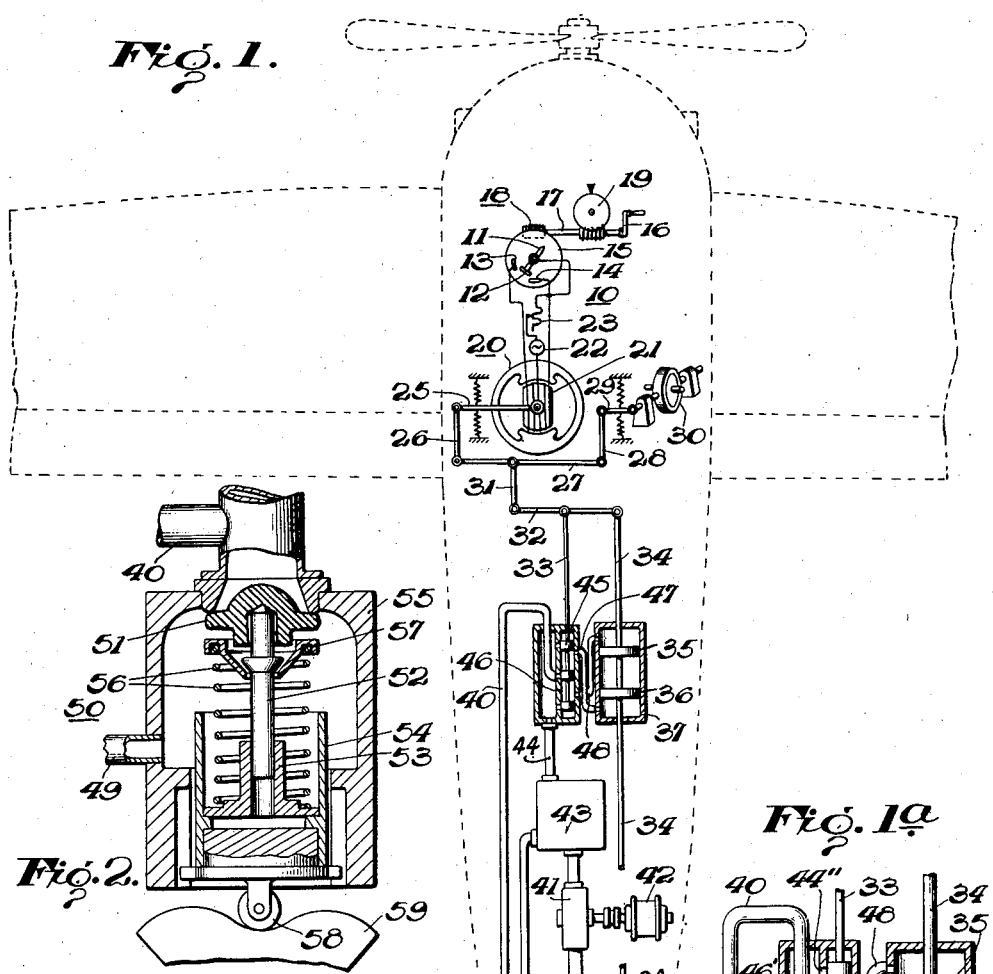
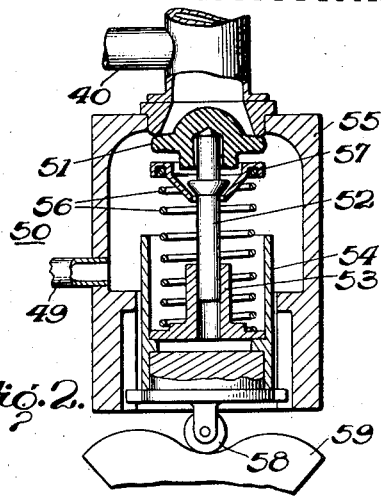
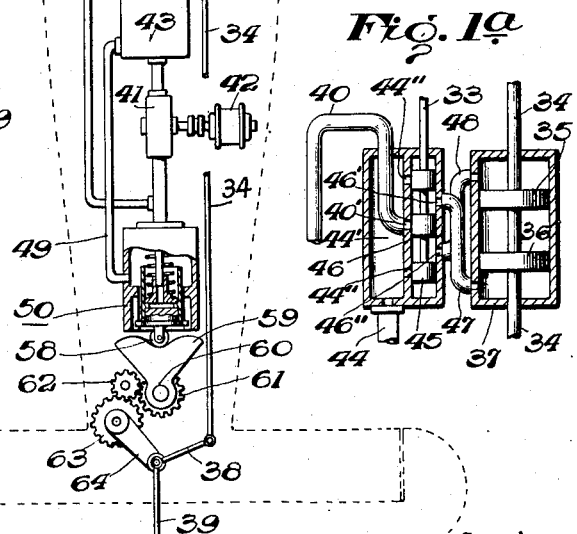
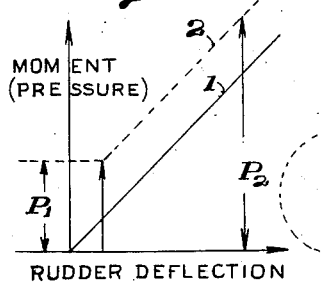
Inventors
Eduard Fischel
Gerhard Rieper
By Stephen Cerstvik Attorney Patented Feb. 1, 1944

2,340,524

UNITED STATES PATENT OFFICE 2,340,524

AUTOMATIC CONTROL FOR AIRCRAFT AND THE LIKE

Eduard Fischel, Berlin-Charlottenburg, and Gerhard Rieper, Berlin-Lichterfeld, Germany; vested in the Alien Property Custodian Continuation of application Serial No. 728,644, June 2, 1934. This application September 15, 1938, Serial No. 230,120. In Germany July 3, 1933

10 Claims. (Cl. 244—78)

This invention relates to automatic control mechanisms for aircraft and the like, and more particularly to control mechanisms operating by means of a pressure medium such as air, water or oil, and is a continuation of our prior application Serial No. 728,644, filed June 2, 1934.

Mechanisms of the above-mentioned type generally work only periodically or at more or less long intervals; nevertheless, they must continuously be ready for operation. Consequently, it is desirable to generate only such a pressure of the operating fluid or amount of energy as is used actually for the controlling, and in this manner it is possible to attain a substantial reduction in the amount of energy used by the control mechanism.

It is known for the said purposes to make use of one or more air-vessels, in which the energy supplied by a pump or any source of power will be stored up during the interval between two control cycles. In connection with these vessels means are provided which will prevent the amount of stored energy from exceeding a predetermined amount.

It is also known for the above said purposes to furnish the control mechanism with two pumps for feeding the operating fluid, the one of which is feeding continuously while the other pump will begin to work and cooperate with the first mentioned pump on the arising of a great demand of pressure or energy.

In all these cases the control mechanism will become relatively complicated and voluminous, in consequence of which it would not be well adapted for automatic control of aircraft and similar purposes.

It is an object of the present invention to provide a comparatively inexpensive and simple device of small weight for effecting an increasing of pressure of the operating fluid on any increase of the demand of pressure or energy, thereby progressively increasing the speed of operation of the controlled member, such as the rudder or other control surface of an aircraft, as the device is moved further from its zero or neutral position.

The said device consists of a control valve arranged in such a manner in the output of the pump feeding the operating fluid of the control mechanism, as to secure automatically in response to needed energy an increase of the pressure, with which the valve disc is pressed on its seat, and consequently the pressure of the operating fluid.

Another object of the invention is to provide means connecting the member to be controlled, such as an aircraft control surface, with the said valve in such a manner that the position of the member or control surface to be controlled will determine the adjustment of the valve and therefore the pressure of the operating fluid, thereby progressively increasing the speed of operation of the controlled member, such as the rudder or other control surface of an aircraft, as the device is moved further from its zero or neutral position.

Still another object is to provide novel means whereby an automatic pilot will continuously apply corrections slowly by actuating the control surface of the aircraft slowly, to keep the craft on a predetermined course and/or on an even keel, and will apply corrections quickly by actuating the control surface at a faster rate when required, to counteract air disturbances such as bumps and gusts.

A further object of the invention is to provide, in combination with an aircraft having a control surface for controlling the aircraft about an axis, novel means for providing a variable speed of actuation of the control surface such that a minimum speed of actuation is obtained at end near the zero or neutral position of the servo mechanism and/or control surface and as the servo mechanism and/or control surface departs from the zero or neutral position in either direction, the speed of actuation of the surface is progressively increased as the departure of the control surface from neutral increases. Accordingly, large corrections for bringing the aircraft back to a desired attitude are produced more rapidly than heretofore, and small corrections are produced relatively more slowly.

In a fluid pressure operated servo motor of the piston and cylinder type, for example, the foregoing operation is obtained by increasing the fluid pressure to the servo-motor as the piston moves the control surface further from the zero or neutral position.

For a more complete understanding of the invention reference should be had to the accompanying drawing, in which as an illustrative example the invention is shown in its application to the controlling of a rudder of an aircraft although the invention can also be used for other purposes. It is to be expressly understood, however, that the drawing is merely for purposes of illustration and description only and is not to be construed as defining the limits of the invention, reference being primarily had for this purpose to the appended claims.

In the drawing, wherein like reference characters refer to like parts in the several views:

Fig. 1 is a plan view of one form of control mechanism embodying the invention as applied to the control of a rudder of an aircraft shown in dotted lines;

Fig. 1a is an enlarged sectional view of a servomotor and of a piston valve cooperating therewith;

Fig. 2 shows upon an enlarged scale the control valve of the embodiment according to Fig. 1; and Fig. 3 is a diagram illustrating the relation between the moment required for the adjusting of the rudder or other control surface and the moment of the control mechanism in dependency on the angular adjustment of the rudder or control surface, or generally of the member to be adjusted by the control mechanism.

The invention consists substantially in the construction, combination, location and relative arrangement of parts for obtaining the results desired in accordance with the foregoing objects, as will be more fully hereinafter set forth in the specification, as shown in the drawing by way of example, and as finally pointed out in the claims.

Referring now to the drawing and more particularly to Fig. 1, the instrument 10 is shown as a directional device, for example, and serves to measure or to respond to the deviation of the aircraft from a predetermined direction and, as is shown in Fig. 1, it may be a liquid magnetic compass. The magnetic needle 11 of the compass carries an electrode 12, movable between two electrodes 13 and 14 fixed to the compass casing 15, which casing is filled with an electrolytic fluid and has a bearing for the pivoted needle 11. The latter, as usual, points in the magnetic north-south direction and retains this direction substantially even when the aircraft swings about its upright axis. Such swing of the craft will bring either the electrode 13 or the electrode 14 closer to the electrode 12, it being understood that all three electrodes (as well as the compass needle 11) are within the casing 15 and in contact with the liquid therein. The compass casing 15 may be rotated about the axis of the needle 11 relatively to the aircraft for changing course, by means of the handle 16, the shaft 17 and the worm gear 18, the wheel of which is fixed to the compass casing 15 and the worm of which is mounted on the shaft 17. The course for which the craft has been set can then be read off on the indicator scale 19 driven from said shaft 17 in any suitable manner as, for example, by worm gearing.

The above mentioned electrodes 12, 13 and 14 of the compass 10 are arranged in an electrical circuit including the said electrodes and conductors leading therefrom, the electrodes 13, 14 being connected with the terminals of the armature winding 21 of an electromagnet 20, while the electrode 12 is connected with an alternating current source 22 through the regulating resistor 23, the other terminal of said source being connected with an intermediate point of the winding 21. As will be clear from the drawing, the armature winding 21 of the electromagnet 20 thus consists of two parts forming a differential system with the above said parts of the circuit. In consequence of this, the armature of the magnet will respond only to the difference in the currents flowing through the two parts of its winding and will, for that reason, take the zero position, if the needle 11 of the compass 10 is in the middle position between the two electrodes 13 and 14 fixed to the compass casing 15.

At the beginning of the flight, the crank or handle 16 is operated to turn the compass casing 15 relatively to the aircraft to the position corresponding to the desired course as set with the aid of the indicator 19. Assuming that the craft is following the intended course, the electrode 12 will be in exactly median position relatively to the electrodes 13 and 14. This will cause exactly equal currents to flow through the two circuits supplied from the source 22. One of these circuits includes the electrode 13, the conductor leading from said electrode to one terminal of the winding 21, one-half of said winding, and the portion of the electrolyte between the electrodes 12 and 13, together with a portion common to both circuits, viz. the electrode 12, the needle 11, the conductor leading therefrom to the resistance 23, said resistance, the current source 22, and the conductor leading from said source to the intermediate point of the winding 21. The other circuit includes, in addition to those common to both circuits, the following parts: the electrode 14, the conductor leading therefrom to the other terminal of the winding 21, the other half of said winding, and the portion of the electrolyte between the electrodes 12 and 14. It will be seen that when, as assumed, the electrode 12 is in the median position, that is to say equidistant from the electrodes 13 and 14, the resistance of the electrolytic liquid between 12 and 13 will be exactly the same as that of the liquid between 12 and 14. Thus currents of equal strength will flow through the two halves of the winding 21, and therefore the armature of the magnet 20 will remain in the median position illustrated by Fig. 1. Assuming now that the course of the aircraft is altered in such a direction as to bring the electrode 13 closer to the needle electrode 12 and consequently bring the electrode 14 farther away from said needle electrode (this relative position of the three electrodes is indicated in Fig. 1), the result will be that the resistance of the liquid between 12 and 13 is reduced, while at the same time the resistance of the liquid between 12 and 14 is increased. This will increase the current in the branch circuit containing the electrode 13, and decrease the current in the branch circuit containing the electrode 14. The armature carrying the coil or winding 21 will therefore be deflected in the corresponding direction (clockwise in Fig. 1). Should the course of the craft be altered in the opposite direction, so as to bring the electrode 14 closer to the electrode 12, the armature of the electromagnet 20 will be deflected in the opposite direction (contra-clockwise in Fig. 1).

The armature of the electromagnet 20 is coupled by means of a lever 25 and a rod 26 to the one end of a differential lever 27, the other end of which is pivotally connected by means of a rod 28 and a lever 29 to a so-called turn indicator 30. The last mentioned instrument measures the angular velocity or rate of turn with which the aircraft deviates from the predetermined direction. It is well known to use such an instrument in connection with automatic steering devices for aircrafts for the purpose of preventing oscillations of the aircraft about the desired direction. The said differential lever 27 will accordingly move in response to the deviation of the aircraft from the desired direction and to the angular velocity with which the said deviation takes place.

Motion of the differential lever 27 is transmitted by means of a connecting rod 31 to a lever 32 linked at its one end to the said rod 31 and at its middle to a valve stem 33. At its other end the lever 32 is pivotally connected to a piston-rod 34, which carries two pistons 35 and 36 working in cylinder 37 and is coupled at its other end by means of a lever 38 to the member to be controlled, illustrated as the lateral rudder 39 of an aircraft. The said pistons 35 and 36 and the cylinder 37 constitute together the hydraulic servomotor for adjusting the member to be controlled.

By means of a conduit 40 the cylinder 37 of the hydraulic servomotor is connected to a source of operating fluid, illustrated as a pump 41 driven by a motor, for example an electromotor 42, and feeding out of a reservoir 43 into the said conduit 40. The fluid discharged by the hydraulic motor 35, 36, 37 passes through a conduit 44 to the said reservoir 43.

Transmission of operating fluid to the hydraulic motor is controlled by a three-part piston valve 45 fixed to the above said stem 33 and operating in a valve chamber 46 to which the conduits 40 and 44 are connected. The last mentioned conduit 44 is connected by a channel 44' to the two outer ports 44'' of this chamber 46, while the first named conduit 40 enters the chamber 46 about its middle through a port 40'. The three parts of the piston-valve 45 are so arranged that in the position shown they will maintain the said three ports closed. On the right of the middle part of the chamber 46 are two ports 46', 46'' which are connected by passages 47 and 48 respectively with the opposite ends of the cylinder 37. In the position illustrated, the piston valve 45 is clear of the ports 46', 46''.

So far as the piston rod 34 is connected to the lever 32 it forms in the well known manner the usual follow-up mechanism to restore the valve 45 to its original position. Thus, if for instance the armature carrying the coil 21 is deflected contra-clockwise, the linkage 25, 26, 27, 31, 32 is shifted to carry the valve stem 33 and the valve 45 downwardly, so that pressure fluid will pass from the conduit 40 through prot 40', the compartment of valve chamber 46 immediately above the middle member of valve 45, port 46' and passage 47 to the lower compartment of cylinder 37. At the same time, the port 44'' will be uncovered so that as the pistons 35, 36 move upward, fluid may escape from the upper compartment of cylinder 37 through passage 48, port 46'', the compartment of valve chamber 46 immediately below the middle member of valve 45, port 44'' and channel 44' to the conduit 44. The upward movement of the piston rod 34 will swing the lever 32 clockwise about its left hand end as a temporary fulcrum, and will thus lift the valve stem 33 and the piston-valve 45 back to their original position.

The novel means of the invention are now provided whereby a variable speed of actuation of the control surface or rudder 39 is obtained such that a minimum speed of actuation is obtained at and near the zero or neutral position of the pistons 35 and 36 and/or rudder 39, and as said pistons and/or rudder depart from the zero or neutral position, the speed of actuation of said rudder is progressively increased as the departure thereof from neutral increases. For this purpose and to this end there is provided, parallel to the above described feeding path for the operating fluid, a second feeding path including the valve 50, the conduit 49 and the reservoir 43. Referring to Fig. 2 showing the valve upon an enlarged scale the valve contains a valve disc 51 carried by stem 52 sliding in a cylindrical guide 53 forming part of a piston 54. This piston is guided at the one end of the valve chamber 55 which chamber is kept tight at the said end in any known manner. A spring 56 abuts at its one end on the said piston 54 and at its other end by means of a disc 57 on a shoulder on valve stem 52.

The piston 54 carries at its other end a bearing fork for a roll 58 engaged by a curved disc or cam 59 at its edge. The said curved disc or cam 59 is rotatably mounted at 60 and, as will be clear from Fig. 1, is connected rigidly with a toothed wheel 61 meshing by means of an intermediate wheel 62 with a toothed wheel 63, the shaft of which is coupled (for instance by a belt transmission 64) with the pivot of the control surface or rudder 39.

The above said curved disc or cam 59 is so shaped that upon rotation of the disc in the clockwise or counterclockwise sense it will move the piston forwards and increase the tension of spring 56. As the control surface or rudder 39 is coupled with the said curved disc 59, the deviation of said control surface or rudder from its middle or zero position will effect the said increase of the spring tension.

The operation of the mechanism is as follows: The parts are in Figs. 1 and 2 represented in the positions they occupy at the instant at which the aircraft or other body governing the control mechanism has the desired position. Upon deviation of aircraft from the predetermined direction, the piston valve 45 moves in response to the combined action of the compass 10 and the turn indicator 39. In consequence thereof the pistons 35, 36 of hydraulic motor will move in a well known manner and adjust the control surface or rudder 39 of the aircraft.

Upon rotation of the control surface or rudder 39 the curved disc or cam 59 also rotates in the manner described above thereby increasing the tension of spring 56. This has the effect that first the amount of operating fluid passing through the valve 50 and the conduit 49 decreases, and simultaneously the pressure and the amount of operating fluid fed into the conduit 40 will increase. As on the other hand the power or moment needed for adjusting the rudder 39 increases according to the amount of angular deviation of the control surface or rudder from its middle or zero position, the valve 50 will automatically adapt at each time the energy or pressure of operating fluid to the amount or value required momentarily, thereby providing a variable speed of actuation of the control surface or rudder 39, which varies with the amount of displacement of said rudder and/or pistons 35, 36 from the zero or neutral position thereof, and thus providing large corrections more rapidly and small corrections relatively more slowly for bringing the aircraft back to its desired course or attitude.

If the control or rudder 39 and, therefore, also the curved disc or cam 59 take the zero position, the tension of spring 56 and hence the load of pump 41 will have the smallest value. Inasmuch as at the said zero position the pressure of operating fluid must already have a certain value, it will be advantageous to form the curved disc or cam 59 in such a manner that the pressure will begin to increase only after a certain deviation of the said disc from zero position. This will also be advantageous in order to avoid disturbing pendulum effects. For a better understanding Fig. 3 shows approximately in line 1 the increase of moment for adjusting the rudder and in line 2 the increase of pressure of the operating fluid both in dependency on the deviation of the rudder 39 from its zero position. That is to say, in Fig. 3 the abscissae indicate rudder deflections, while the ordinates indicate pressure (with reference to line 2) and moment (with reference to line 1). It has been found advantageous to choose the rate of the smallest pressure $P_1$ to the greatest pressure $P_2$ of operating fluid as 2:5 or greater.

It will be clear from the above description that the new control mechanism will adapt, in a very simple manner, the value of pressure or energy to the amount required at any time, and will progressively increase the speed of actuation of the pistons, 35, 36 and/or the control surface or rudder 39 as the pistons and/or rudder depart further from their zero or neutral position. As described above the adjustment of the control surface or rudder 39 depends on the combined action of the two instruments 10 and 30. Therefore, the adjustment of the valve 50 coupled with control surface or rudder 39 will also depend on the combined action of the two instruments 10 and 30. Hence, it will be clear that besides the embodiment above described and shown in the drawing, in which embodiment the said instruments act upon the valve 50 by means of the hydraulic motor 35, 36, 37 and the rudder 39, other embodiments of the invention, in which the control instruments act upon the valve 50 in any other way, may be found by those skilled in the art.

By the term "free load" used in some of the appended claims in connection with the valve (51), is meant that the loading of the valve (exerted thereon by the spring 56) which tends to close said valve, or to hold it closed, is effected not by moving the valve itself but by simply adjusting (by means of the curved disc or cam 59) the pressure by which the valve is urged in the closing direction, independently of the position of the valve relatively to its seat.

While the invention has been illustrated and described as embodied in a particular concrete form, it should be understood that the invention is not limited thereto, since various modifications thereof will suggest themselves to those skilled in the art without departing from the spirit of the invention, the scope of which is set forth in the annexed claims.

What is claimed is:

1. In an automatic control for aircraft and the like having a control surface for controlling the craft about an axis, the combination of means responsive to deviations of said craft about said axis, a fluid pressure actuated servo-motor connected to said control surface for actuating the same, means for continuously supplying a fluid operating medium to said servo-motor, means actuated by said deviation responsive means for controlling the flow of said fluid medium to said servo-motor to actuate the latter, means comprising a yieldingly loaded valve exposed to the pressure of said fluid medium and determining the pressure thereof, and means responsive to the position of said control surface for effecting an adjustment of the free load on said valve, whereby the pressure of the operating fluid supplied to said servo-motor is automatically increased so that the speed of actuation of said control surface is progressively increased as said control surface departs further from its zero or neutral position.

2. In an automatic control for aircraft and the like having a control surface for controlling said craft about an axis, the combination of means responsive to deviations of said craft about said axis, a fluid pressure actuated servo-motor connected to said control surface for actuating the same, means for continuously supplying a fluid operating medium to said servo-motor, means actuated by said deviation responsive means for controlling the flow of said fluid medium to said servo-motor to actuate the latter, means providing a branch line for diverting a portion of said fluid medium, a valve controlling said branch line and exposed on one side to the pressure of said fluid medium, a spring urging said valve in opposition to said pressure, and means responsive to the position of said control surface for adjusting the free load on said spring and thereby adjusting the amount of fluid medium diverted and the pressure of the fluid medium continuously delivered to said servo-motor so that the speed of actuation of said control surface is progressively increased as said control surface departs further from its zero or neutral position.

3. In an automatic pilot, the combination of a directional device, a rudder, means comprising a servo-motor connecting the directional device operatively with said rudder, a pump having a delivery connection for continuously supplying a fluid operating medium to said servo-motor, a yielding valve exposed to the delivery pressure of said pump and loaded to oppose said pressure and determine the magnitude thereof, and means responsive to the position of said rudder to effect an adjustment of the free load on the valve and thereby automatically adjust the pressure of the continuously supplied operating fluid to the working requirements so that the rate of movement of the rudder is progressively increased as it moves further from its neutral position.

4. In an automatic pilot, the combination of a compass, a rudder, means comprising a servo-motor connecting the compass operatively with said rudder, a pump having a delivery connection for continuously supplying a fluid operating medium to said servo-motor, means providing a by-pass connected with the delivery side of the pump, a valve controlling said by-pass and exposed on one side to the delivery pressure of said pump, a spring urging said valve in opposition to said pressure, and means responsive to the position of said rudder to adjust the free loading of said spring and thereby adjust the amount of the fluid by-passed and the pressure of the fluid continuously delivered to the servo-motor in accordance with the working requirements so that the rate of movement of the rudder is progressively increased as it moves further from its neutral position.

5. A mechanism according to claim 3, in which the rudder is connected operatively with the means for adjusting the load on the valve so that the position of said rudder within its range of movement will determine the loading of the valve.

6. A mechanism according to claim 3, in which the rudder is operatively connected with a cam to move the latter, and in which said cam operates to adjust the load on the valve in conformity to the required variation in pressure for the range of movement of said rudder, so that the rate of movement of said rudder is varied as it moves from its neutral position.

7. An automatic pilot, the combination of a compass, a rudder, a servo-motor connecting the compass operatively with said rudder, means for continuously supplying a fluid operating medium to said servo-motor, a yielding loaded valve exposed to the pressure of said fluid medium and determining the pressure thereof, means for applying to said valve a free load opposing the pressure exerted by said fluid medium on said valve, an element movable to effect an adjustment of the free load on said valve, and an operative connection responsive to changes in the position of said rudder to move said element whenever there is a change in such position and thereby automatically adjust the pressure of the continuously supplied operating fluid to the working requirements so that the rate of movement of said rudder is progressively increased as it moves further from its neutral position.

8. In an automatic pilot, the combination of a directional device, a rudder, means comprising a servo-motor connecting the directional device operatively with said rudder, means for continuously supplying a fluid operating medium to said servo-motor, means providing a branch for diverting a portion of the fluid medium flowing toward the said servo-motor, a valve controlling said branch and exposed on one side to the pressure of said fluid, a spring urging said valve in opposition to said pressure, an element movable to adjust the free loading of said spring, and an operative connection responsive to changes in the position of said rudder to move said element whenever there is a change in such position and thereby automatically adjust the pressure of the continuously supplied operating fluid to the working requirements so that the rate of movement of said rudder is progressively increased as it moves further from its neutral position.

9. In an automatic pilot, the combination of a directional device, a rudder, means comprising a servo-motor connecting the directional device operatively with said rudder, means for continuously supplying a fluid operating medium to said servo-motor, a yielding loaded valve exposed to the pressure of said fluid medium and determining the pressure thereof, an element movable to effect an adjustment of the free load on said valve, and means providing an operative connection between the rudder and said element to move the latter whenever there is a change in the position of said rudder, thereby automatically to adjust the pressure of the continuously supplied operating fluid to the working requirements so that the rate of movement of the rudder is progressively increased as it moves further from its neutral position.

10. In an automatic pilot, the combination of a rudder, a servo-motor for operating said rudder, means for continuously supplying a fluid operating medium to said servo-motor, a directional device for controlling said servo-motor, a yielding loaded valve exposed to the pressure of said fluid medium continuously supplied to said servo-motor, an element movable independently of said fluid-supplying means to effect an adjustment of the free load on said valve, and means providing an operative connection responsive to changes in the position of said rudder to move said element whenever there is a change in such position and thereby automatically adjust the pressure of the continuously supplied operating fluid to the working requirements so that the rate of movement of the rudder is progressively increased as it moves further from its neutral position.

EDUARD FISCHEL.
GERHARD RIEPER.